United States Patent [19]

Deutsch et al.

[11] 4,327,419
[45] Apr. 27, 1982

[54] DIGITAL NOISE GENERATOR FOR ELECTRONIC MUSICAL INSTRUMENTS

[75] Inventors: Ralph Deutsch; Leslie J. Deutsch, both of Sherman Oaks, Calif.

[73] Assignee: Kawai Musical Instrument Mfg. Co., Ltd., Hamamatsu, Japan

[21] Appl. No.: 123,632

[22] Filed: Feb. 22, 1980

[51] Int. Cl.³ .................. G06F 15/31; G10H 1/00
[52] U.S. Cl. ........................... 364/717; 84/1.01
[58] Field of Search .............. 364/717; 84/1.01; 331/78

[56] References Cited

U.S. PATENT DOCUMENTS

| | | | |
|---|---|---|---|
| 3,614,399 | 10/1971 | Linz | 364/717 |
| 3,703,727 | 11/1972 | Knowlton | 364/717 X |
| 4,194,427 | 3/1980 | Deutsch | 364/717 X |
| 4,218,748 | 8/1980 | Goodwin | 364/717 |

OTHER PUBLICATIONS

Mitchell et al, "Table-Lookup Methods for Generating Arbitrary Random Numbers", *IEEE Trans. on Computers*, vol. C-26, No. 10, Oct. 1977, pp. 1006-1008.

*Primary Examiner*—David H. Malzahn
*Attorney, Agent, or Firm*—Ralph Deutsch

[57] ABSTRACT

In an electronic musical instrument apparatus is provided for generating a noise-like signal suitable as source for a variety of musical effects such as the imitation of percussive musical instruments. Noise-like signals of predetermined spectral shape are produced by adding values from a sinusoid table by means of an address control which is incremented randomly according to a decision rule. The decision rule is implemented by a comparison of stored constant values with random values generated by a white noise source. The generated noise-like signals are advantageously employed in digital electronic musical instruments.

16 Claims, 6 Drawing Figures

DIGITAL NOISE GENERATOR FOR ELECTRONIC MUSICAL INSTRUMENTS

BACKGROUND OF THE INVENTION

1. Field of the Invention

This invention relates broadly in the field of electronic musical tone generators and in particular is concerned with the provision for a digital noise generator in a musical instrument.

2. Description of the Prior Art

While the majority of musical tones are characterized by a well-defined pitch, there exists a large group of musical instruments which have no clearly defined pitch characteristic. Such instruments generally are members of the percussion family. These include drums, cymbals, maracas, wood blocks, and tamborines. It is well known in the electronic music art that these "unpitched" musical sounds can be imitated using a random noise generator as the primary signal source. Examples of the application of random noise generators in an electronic musical instrument are contained in U.S. Pat. No. 3,247,307 entitled "Electronic Musical Instrument."

The most common characteristic of most noise generators is that they produce a noise signal of the type given the generic name of "white noise." White noise can be defined as a signal which is uniformly and randomly distributed in amplitude and has a power spectrum which is constant per unit bandwidth over the entire frequency region. No musical instrument, or in fact any real physical device, has a signal characteristic that approaches that of a white noise signal type. An unpitched musical instrument's signal output has a power spectrum that tends to fall off at high frequencies in a manner similar to the response shape of a low-pass filter.

Noise signal sources having a power spectrum that is not white are frequently described by the generic name of "pink noise." A more limited use of the term pink noise has been applied to the special case of a noise signal whose spectrum contains constant power per percentage bandwidth for all frequencies. The broader generic definition of pink noise will be used in the following descriptions.

Pink noise generators have been used in conjunction with the tone generators of the analog variety and it is evident that pink noise generators are also desirable adjuncts to musical tone generators of the digital variety. A method for generating an analog noise signal is described in the technical article: D. B. Keele, Jr., "The Design and Use of a Simple Pseudo Random Pink-Noise Generator," *J. Audio Engineering Society*, Vol. 21 (January/February 1973), pp. 33–41. The system described in the article starts with a conventional shift register variety of a binary white noise generator. The output random sequence of "0" and "1" signal states from the shift register are transformed by an analog filter to produce the desired pink noise signal.

It is obvious to those skilled in the art that the binary white noise generator output signals from a shift register noise generator can also be processed by a digital filter to produce a source of digital pink noise. One disadvantage to this conventional and straightforward approach is that the use of a digital filter is not a simple and low cost system implementation. The high cost of a digital filter is a result of the need to use one or more digital data multipliers.

A digital noise generator is described in the copending patent application Ser. No. 95,896 filed on Nov. 19, 1979 and entitled, "A Noise Generator For A Polyphonic Tone Synthesizer." This application issued as U.S. Pat. No. 4,270,430. This application and the present invention have a common assignee. The noise generator disclosed in the copending application is specifically directed to producing noise-like signals having adjustable spectral characteristics to be utilized in a polyphonic tone synthesizer of the type described in U.S. Pat. No. 4,085,644 entitled "Polyphonic Tone Synthesizer." The system operates by providing a set of randomly generated harmonic coefficients which are employed during a computation cycle during which a master data set of equally spaced waveshape points are computed. The master data set is transferred to a note register in a manner such that the generation of the musical instrument's tone is not interrupted. The data residing in the note register is read out sequentially and periodically at a rate determined by an adjustable frequency clock. The output data is converted to positive values and transformed to an analog signal by means of a digital-to-analog converter. Provisions are incorporated for varying the spectral content of the resulting noise-like signal by an adjustable formant subsystem.

It is a feature of the present invention that pink noise with a wide variety of spectral shapes can be generated directly without the use of either an analog or digital filter. The underlying mathematical theory of the noise generator of the present invention is essentially contained in the two articles: C. T. Mullis and K. Steiglitz, "Circulant Markov Chains as Digital Signal Sources," *IEEE Trans. Audio Electroacoust.*, Vol. 20, October 1972, pp. 246–248; L. J. Siegel, K. Steiglitz, and M. Zuckerman, "The Design of Markov Chains for Waveform Generation," *IEEE Trans. Audio Electroacoust.*, Vol. 24, December 1976, pp. 558–562.

The above referenced articles provide the theoretical background for the use of circulant markov chains as a noise generation source but no practical means is described for implementing a pink noise generator in a viable system form. The present invention provides a novel means for producing digital pink noise signals with adjustable spectral responses without using conventional digital filters. It is a feature of this invention that the noise spectral characteristics can be made time variant in a simple and controlled fashion.

SUMMARY OF THE INVENTION

The present invention is directed to a novel and improved arrangement for producing a digital noise-like signal having easily adjustable spectral characteristics which can be utilized in an electronic musical instrument to produce a variety of musical effects including unpitched musical sounds.

In brief, this is accomplished by addressing trigonometric sinusoid values stored in a table of sinusoid values by means of a table address signal which is generated in such a fashion that the addressed values constitute a digital pink noise source of a predetermined spectral form. The table address signal is generated by successively accumulating data selected in a probablistic fashion from either a first advance table of numerical values or a second advance table of numerical values. The spectral characteristic of the output noise signal from values addressed out of the table of sinusoid values is controlled by a selection of the particular data values addressed out from the first and second advance tables. A white noise generator, of the shift register with feedback type, is used as a source of random comparison signals. Two data comparators are used to generate data select signals in response to a comparison between the current state of the white noise generator and two prespecified constants provided by a selection from a table of values that correspond to predetermined output pink noise spectral responses. The output signals from the two data comparisons are used by a data select which chooses data output from either the first or second advance table. The selected data is successively accumulated in an accumulator to form the table address signal.

It is an objective of the present invention to simply and efficiently generate digital pink noise with prespecified and controllable spectral characteristics without the use of digital filters.

It is another objective of the present invention to generate digital pink noise using digital logic circuitry which can be readily and economically realized with microelectronic circuitry.

It is a further objective of the present invention to generate digital-pink noise having a time variant power spectral characteristic.

BRIEF DESCRIPTION OF THE DRAWINGS

For a better understanding of the invention reference should be made to the accompanying drawings.

DETAILED DESCRIPTION OF THE INVENTION

The present invention is directed to an apparatus for generating a digital noise-like signal having adjustable spectral characteristics to be utilized as a component of an electronic musical instrument.

Figure 1:
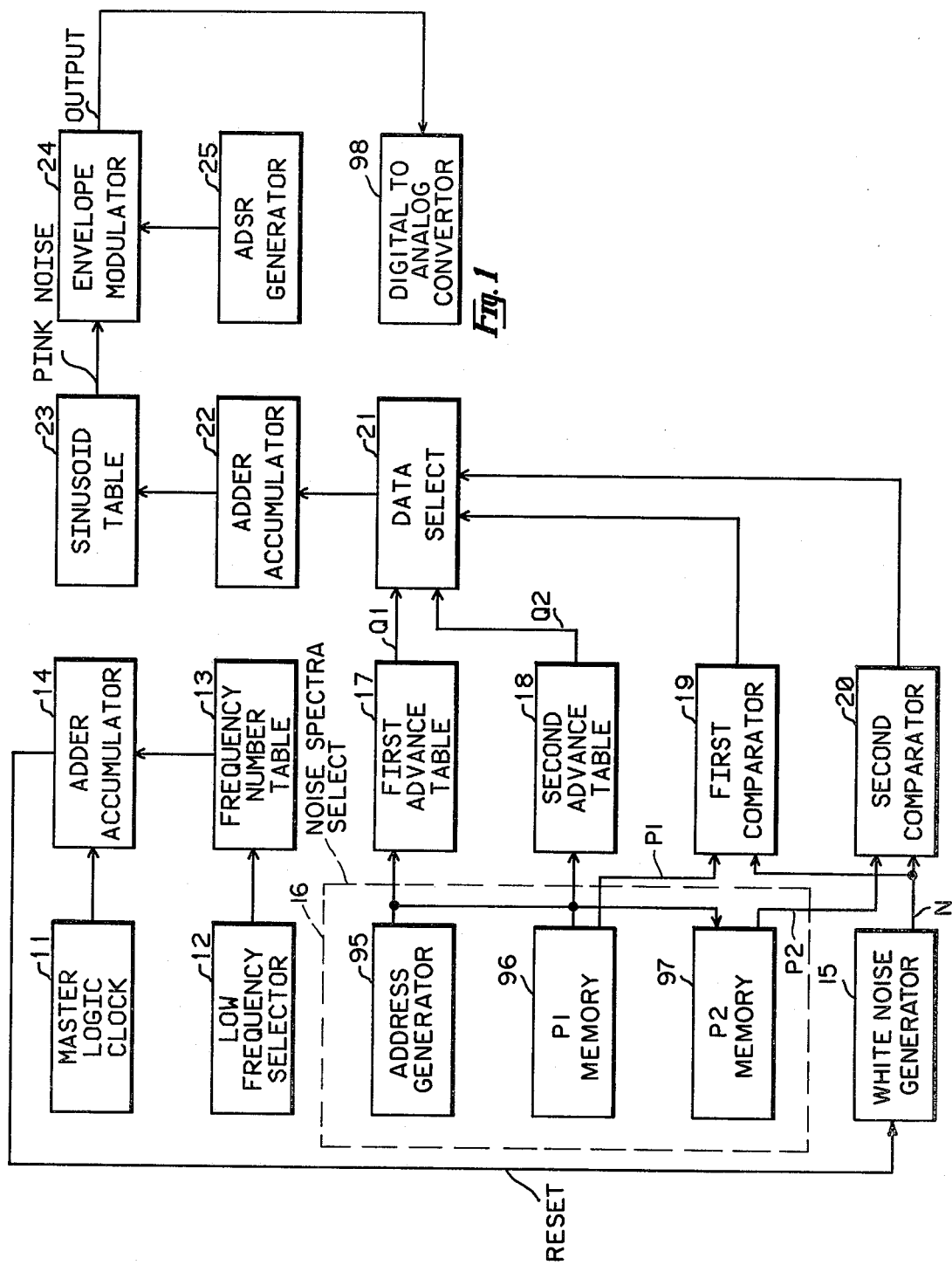
FIG. 1 is a schematic diagram of an embodiment of the invention.

FIG. 1 shows an embodiment of the present invention which generates digital noise-like signals having adjustable spectral characteristics.

Master logic clock 11 is a fixed frequency source of timing signals used to control all the logic timing functions of the noise signal generating system.

A variable low frequency source of timing signals is created by the combination of the logic blocks: master logic clock 11, low frequency selector 12, frequency number table 13, and adder accumulator 14. This combination constitutes what is commonly called a noninteger frequency divider. The low frequency selector 12 is a means for providing addresses for reading data from the stored values in the frequency number table 13. The low frequency selector 12 can be implemented in a variety of ways including a simple multiposition switch having a contact corresponding to each data value in the frequency number table 13.

The data stored in the frequency number table 13 corresponds to a set of preselected frequency values to be furnished by the variable low frequency timing signals. At each timing signal from the master logic clock 11, the current value accessed from the frequency number table 13 is added to the contents of the adder-accumulator 14. Each time the accumulator in the adder-accumulator resets to its initial state because of its modulo accumulation implementation, a RESET signal is generated, this signal constitutes the output signal of the variable low frequency timing signal generator for the noise-generation system of the present invention. The low frequency timing signals can alternatively be implemented using any of the known wide variety of adjustable frequency timing clocks. A voltage controlled oscillator can readily serve as the source of timing signals. One such implementation of a variable frequency timing source is described in detail in U.S. Pat. No. 4,067,254 entitled "Frequency Number Controlled Clocks" which is hereby incorporated by reference.

Figure 2:
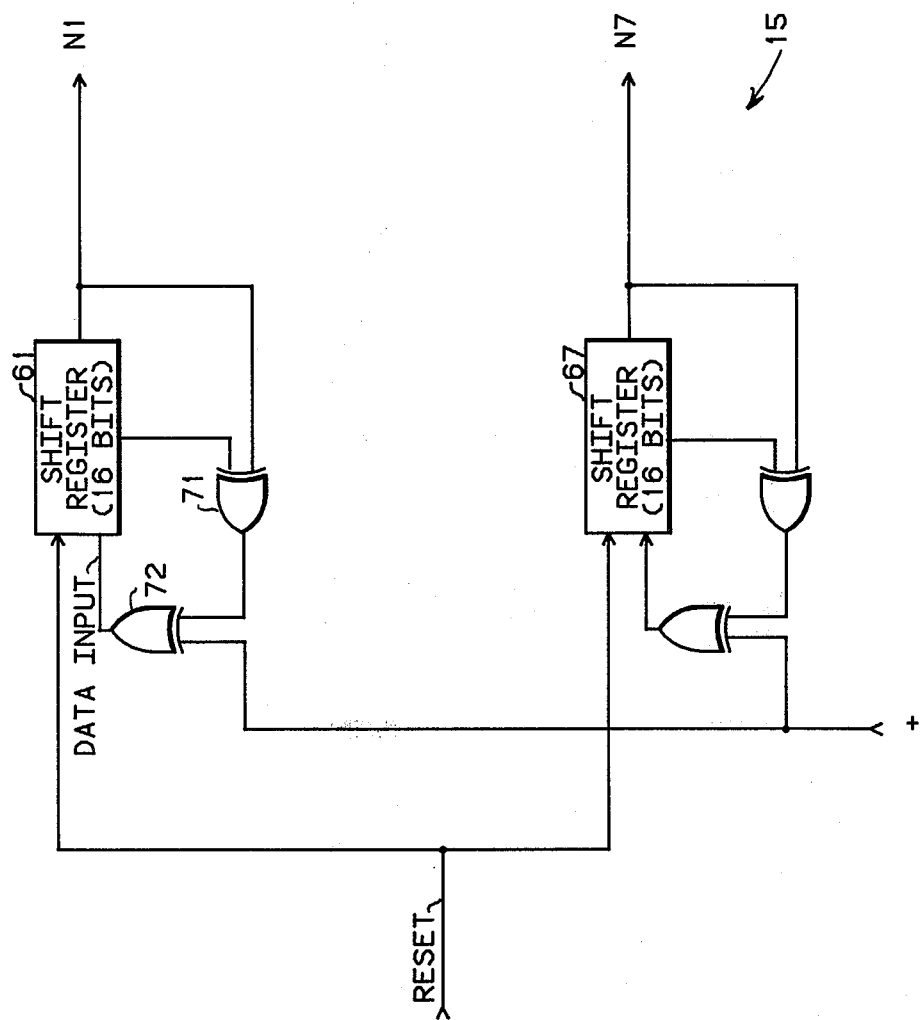
FIG. 2 is a schematic diagram of a random noise generator.

White noise generator 15 creates a sequence of random digital values in response to the RESET signal. Any member of the large variety of well known white random noise generators can be used to implement the white noise generator 15. FIG. 2 shows the logic of a suitable implementation of a random number generator using conventional shift registers for generating noise digital words.

The output signals from the 3rd stage and the 16th stage of shift register 61 are provided as input signals to EX-OR gate 71. The output signal from this gate is provided as one of the inputs to the EX-OR gate 72. The second input is maintained at the "1" logic state by a connection to the power source. The purpose of EX-OR gate 72 is to make the noise generator self-starting when power is applied to the system.

The RESET signal is also used to advance the data in the set of shift registers 61 through 67. The number of such shift registers used to implement the white noise generator 15 is equal to the number of bits desired in the system. Advantageously, 7 bits are used as, designated by the output bit labels N1 through N7, to form the noise digital words.

The sequence of generated random numbers from the generator shown in FIG. 2 will be of length $2^n - 1$, where n=16 is the length of the shift registers measured in binary bits. This repetition length is a very large number and the periodicities will occur at very low frequencies which are usually too low to effect the musical applications for which the system shown in FIG. 1 is employed.

The first advance table 17 is an addressable memory storing values of a constant denoted as $Q_1$. The second advance table 18 is also an addressable memory storing values of a constant denoted as $Q_2$. A method for computing suitable paired values of the constants $Q_1$ and $Q_2$ is described later. The constants $Q_1$ and $Q_2$ are called the advance increments.

Noise spectral select 16 is used to generate addresses to read out a pair of corresponding values of $Q_1$ from the first advance table 17 and $Q_2$ from the second advance table 18. This selection device, labeled address generator 95, can be implemented in any suitable fashion and in its simplest form can be a multiposition switch. The noise spectral select 16 also contains two memories storing sets of preselected comparison constants $P_1$ and $P_2$. These memories are the $P_1$ memory 95 and the $P_2$ memory 95. The values of $P_1$ and $P_2$ are selected to correspond to each pair of selected values $Q_1$ and $Q_2$ from the first and second advance tables. A method for computing appropriate values of the stored set of paired constants $P_1$ and $P_2$ is described later.

The accessed value $P_1$ from the noise spectra select 16 is supplied as one input to the first comparator 19 and the accessed value $P_2$ is supplied as one input to the second comparator 20. The second input to the two comparators is the random number created by the white noise generator 15.

The output signals from the two comparators are used as control signals to the data select 21. Data select 21 will select and transmit to the adder accumulator 22 from the set of values $Q_1$, $Q_2$, and O. The selection of the transmitted values is made according to the following selection rules.

(1) If the random number from the white noise generator 15 is less than $P_1$, then $Q_1$ is selected.

(2) If the random number from the white noise generator 15 is greater than $P_1$, and less than $P_2$, then the zero value is selected.

(3) If the random number from the white noise generator 15 is greater than $P_2$, then $Q_2$ is selected.

Figure 3:
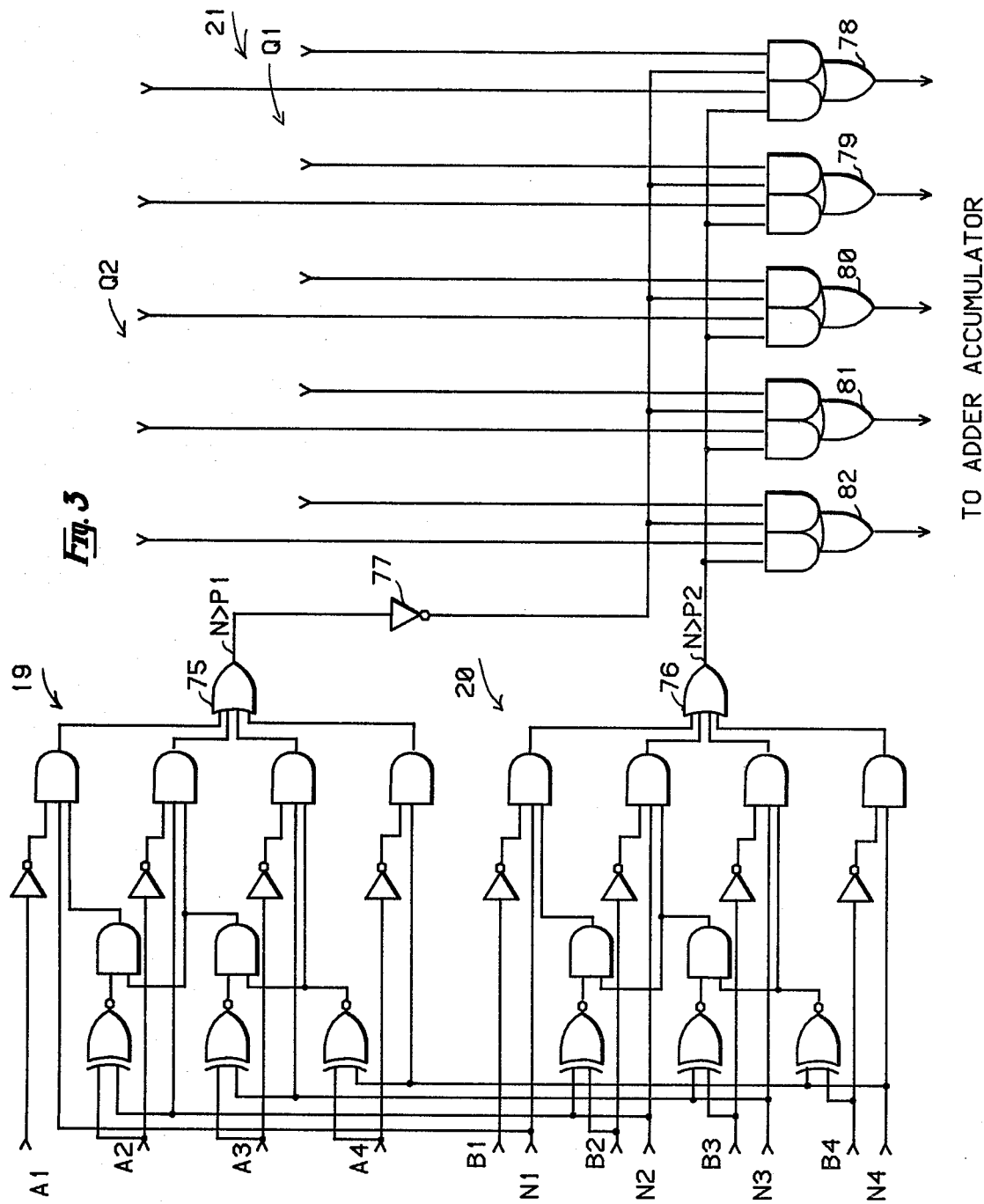
FIG. 3 is a logic diagram of the comparators and data select.

A suitable implementation of the two comparators and data select 21 is shown in FIG. 3 and described below.

The data chosen by the data select 21 are transmitted to the adder-accumulator 22. The input data values are added into the present contents in a modulo N fashion, where N is equal to the number of data values stored in the sinusoid table 23.

The data values accessed out from the sinusoid table 23 in the above described manner will constitute the desired digital pink noise. It is obvious that the pink noise can be obtained in either a binary fixed point format or in binary floating point format simply by storing the sinusoid values in the desired binary form.

The detailed logic of the first comparator 19, second comparator 20, and data select 21 is shown in FIG. 3. To simplify the drawings, FIG. 3 illustrates the case in which the values of $P_1$, $P_2$ and the random signal from the white noise generator 15 are represented as binary values with a word length of four bits. The extension to other word lengths is evident from FIG. 3.

The random signal is represented by the bits N1, N2, N3, N4. $P_1$ is represented by the bits A1, A2, A3, A4. $P_2$ is represented by the bits B1, B2, B3, B4. In each case N1, A1, B1 denote the least significant bits of their associated binary values.

The two comparators are implemented in a conventional fashion using a chain of EX-OR gates. The output logic state of OR-gate 75 will be "1" if the noise signal value N is greater than $P_1$. The output logic state of OR-gate 76 will be "1" if the noise signal value N is greater than $P_2$. Therefore the output logic state of Invertor 77 will be "1" if $N \leq P_1$.

For illustrative purposes, $Q_1$ and $Q_2$ are shown to consist of words of five bits in length. It is evident that the select logic can be readily extended to any other number of binary bits. The data select 21 contains a set of select gates 78 through 82 that are controlled by the logic states of the output of NOR-gate 77 and OR-gate 76.

If N is less than $P_1$, the output of NOR-gate 77 is a "1" and the set of select gates transfers the value of $Q_1$ to the output terminals of data select 21. If N is greater than $P_2$, then the output logic state of OR-gate 76 is a "1" and the set of select gates transfer the value of $Q_2$ to the output terminals. If $N > P_1$ and $N < P_2$, the output logic states of both NOR-gate 77 and OR-gate 76 are both "0" and this combination causes the select gates 78 through 82 to transfer a "0" logic state to the output. The net effect is that the logic shown in FIG. 3 implements the previously listed selection rules for data select 21.

The values of $Q_1$, $Q_2$, $P_1$, and $P_2$ contained in the addressable memories can be calculated from the following set of relations which are listed in the previous reference to the technical article published in the December 1976 issue of the *IEEE Trans. Audio Electroacoust.* These relations are listed for the case in which the output pink-noise corresponds to white noise passed through a one-pole low pass filter.

The specified pole in the complex Z-plane is designated by the radius R and angle $\theta$.

The first advance value $Q_1$, stored in the first advance table 17, is computed from $$Q_1 = INT[N(\theta - \pi)/2\pi] \qquad \text{Eq. 1}$$

N is the number of points stored in a period of the sinusoid function stored in sinusoud table 23. INT[ ] denotes the greatest integer less than or equal to the valued contained within the brackets.

The second advance value $Q_2$, stored in the second advance table 18, is computed from $$Q_2 = INT[NS/2\pi] \qquad \text{Eq. 2}$$

$$S = 2\pi Q_1/N + 2 \arcsin[(1-Y)/(1+R^2-2Y)^{\frac{1}{2}}] \qquad \text{Eq. 3}$$

$$Y = R \cos(\theta - 2\pi Q_1/N) \qquad \text{Eq. 4}$$

The probability associated with the first advance value $Q_1$ is $$p_1 = R/D[\sin(2\pi Q_2/N - \theta) - \sin(2\pi Q_3/N - \theta)] + 1/D \sin[2\pi/N(Q_3 - Q_2)] \qquad \text{Eq. 5}$$

where $$D = \sin[2\pi/N(Q_2 - Q_1)] + \sin(2\pi/N) + \sin[2\pi/N(Q_1 - Q_3)] \qquad \text{Eq. 6}$$

$$Q_3 = Q_2 + 1 \qquad \text{Eq. 7}$$

The probability associated with the second advance value $Q_2$ is $$p_2 = R/D[\sin(\theta - 2\pi Q_1/N) - \sin(\theta - 2\pi Q_3/N)] + 1/D \sin[2\pi/N(Q_1 - Q_3)] \qquad \text{Eq. 8}$$

The probability of a zero increment value to the adder-accumulator 22 is $$P_0 = 1 - p_1 - p_2 \qquad \text{Eq. 9}$$

The sinusoid table 23 contains the values $S_i$, for $$S_i = \cos(2\pi i/N); \quad i = 1, 2, \ldots, N \qquad \text{Eq. 10}$$

The number of values N is selected for convenience. In digital systems it is usually desirable to have N be equal to a power of 2. For most musical applications, it has been found that a value of N=64 is a good choice.

The values of $P_1$ and $P_2$ stored in the noise spectra select 16 are computed from $$P_1 = P_1 \qquad \text{Eq. 11}$$

$$P_2 = 1 - p_2 \qquad \text{Eq. 12}$$

A typical set of data stored in the noise spectrum select 18 and the first and second advance tables is listed in table 1.

TABLE 1

| Entry | θ(Degrees) | P₁ | P₂ | Q₁ | Q₂ |
|---|---|---|---|---|---|
| 1 | 0 | 0.4595 | 0.8903 | −5 | 4 |
| 2 | 5 | 0.4700 | 0.8996 | −4 | 5 |
| 3 | 10 | 0.4808 | 0.9065 | −3 | 6 |
| 4 | 15 | 0.4918 | 0.9112 | −2 | 7 |
| 5 | 20 | 0.4104 | 0.8094 | −2 | 7 |
| 6 | 25 | 0.4197 | 0.8302 | −1 | 8 |
| 7 | 30 | 0.4293 | 0.8487 | 0 | 9 |
| 8 | 35 | 0.4391 | 0.8649 | 1 | 10 |
| 9 | 40 | 0.4492 | 0.8788 | 2 | 11 |
| 10 | 45 | 0.4595 | 0.8903 | 3 | 12 |
| 11 | 50 | 0.4700 | 0.8996 | 4 | 13 |
| 12 | 55 | 0.4808 | 0.9065 | 5 | 14 |
| 13 | 60 | 0.4918 | 0.9112 | 6 | 15 |
| 14 | 65 | 0.4104 | 0.8094 | 6 | 15 |
| 15 | 70 | 0.4197 | 0.8302 | 7 | 16 |
| 16 | 75 | 0.4293 | 0.8487 | 8 | 17 |
| 17 | 80 | 0.4391 | 0.8649 | 9 | 18 |
| 18 | 85 | 0.4492 | 0.8788 | 10 | 19 |
| 19 | 90 | 0.4595 | 0.8903 | 11 | 20 |

The data in Table 1 were computed for the pole radius value $R=0.9$.

Because the accumulator contained in the adder-accumulator 22 is modulo the number of points N contained in the sinusoid table 22, it is not necessary to use negative values of $Q_1$ or $Q_2$. The negative values are changed to positive acting values by means of the relation $$-Q_i = (N+1) - Q_i;\ i=1,2 \qquad \text{Eq. 13}$$

The spectra select 16 can readily be implemented so that its selections can be determined by a time varying control. In this fashion the output digital pink noise is created with a time variant spectra.

A simplification in the noise generating system is obtained by using constant values for $P_1$ and $P_2$ and only changing the values of $Q_1$ and $Q_2$. Results essentially the same as those obtained for the values listed in Table 1 are found for the constant values of $P_1 = 0.5$ and $P_2 = 0.898$.

Figure 4:
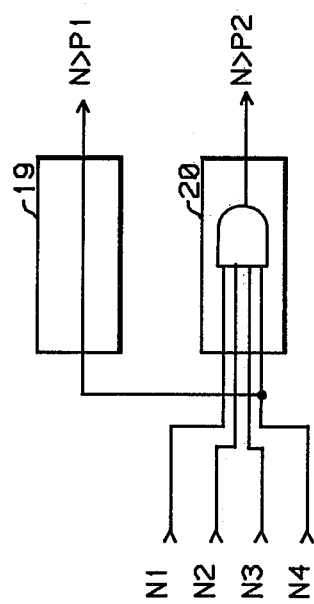
FIG. 4 is a logic diagram of an alternate set of comparators.

FIG. 4 shows the logic for the simplified first comparator 19 and the second comparator 20 for the system using constant values $P_1=0.5$ and $P_2=0.898$ when the noise data is expressed as four binary bits. Since the most significant bit N4 is a "1" for values of N greater than or equal to 0.5, the value of N4 can be connected directly to the NOR-gate 77 of FIG. 3 and in essence the first comparator 19 is replaced by this signal line.

If all the bits N1,N2,N3,N4 have a "1" value, then the noise signal N has the decimal value 0.9375. If the least significant bit N1 has a "0" value, then the noise signal has the decimal value 0.875. Thus if all the bits N1,N2,N3,N4 are inputs to a single AND-gate, the output will have a "1" state if N is greater than the required value of $P_2=0.898$.

Similar reductions in the logic complexity of the two comparators are readily implemented for systems using other stored values of $Q_1$ and $Q_2$ and employing preselected constant values for $P_1$ and $P_2$.

The system shown in FIG. 1 can be further simplified by noting the numerical relation between $Q_1$ and $Q_2$ observed from the data listed in Table 1. Notice that $Q_2 - Q_1 = 9$ for the listed data. Calculations of other tabulated values for a variety of values for the polar radius R shows that one can store only the values of $Q_1$ and find $Q_2$ from the relation $$Q_2 = K + Q_1 \qquad \text{Eq. 14}$$

The value of K can be varied to control the spectral shape of the output pink noise because varying K is essentially equivalent to varying the magnitude of the polar radius R. Values of K in the range of 31 to 9 have been found to produce useful noise spectral shapes.

Figure 5:
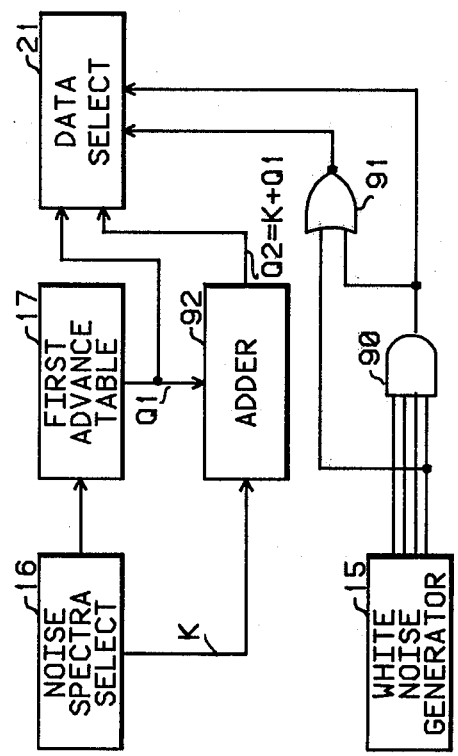
FIG. 5 is a schematic diagram of an alternative embodiment of the invention.

FIG. 5 shows an alternative embodiment of the present invention employing the system data simplifications previously described. The noise spectra select 16 is used to selectively address values of the advance increment $Q_1$ from the first advance table 17. The noise spectra select 16 now contains a table of values of K. These can alternatively be computed on command rather than exist as stored values.

Adder 92 receives the addressed value of $Q_1$ from the first advance table 17 and adds the current value of K to produce the second advance increment $Q_2$. The two comparators used in the system shown in FIG. 1 are replaced by the NOR-gate 91 and the AND-gate 90 as previously described in connection with FIG. 4.

FIG. 1 illustrates a means for utilizing the generated digital pink noise in a musical instrument. The ADSR generator 25 is used to provide envelope modulation for the output data sequence addressed from the sinusoid table. The noise data sequence is modulated (scaled in magnitude) by means of the envelope modulator 24 in response to the ADSR signal created by the ADSR generator. This arrangement, for example, can be used to produce cymbal sounds to accompany keys actuated on a musical instrument's keyboard. The key switch actuation is detected by the act of closing a keyswitch and is used to start the ADSR generator 25. The net result is that the output from the envelope modulator 25 is a noise-like signal having an envelope of a shape determined by the ADSR generator 25. The output digital signal can be converted to an analog signal by means of a digital-to-analog converter 98 so that a conventional sound system can be used in common with that of the electronic musical instrument. In this case the envelope modulator 24 is implemented as a digital multiplier.

The digital multiplication can be eliminated by using an ADSR generator having an analog signal output and by using a digital-to-analog converter at the input to the envelope modulator. In this case the envelope modulator 24 can be implemented as a controlled gain analog amplifier.

There is a wide choice of known methods of implementing the ADSR generator 25. One such generator is disclosed in U.S. Pat. No. 4,144,789 entitled "Amplitude Generator For An Electronic Organ" which is hereby incorporated by reference.

Figure 6:
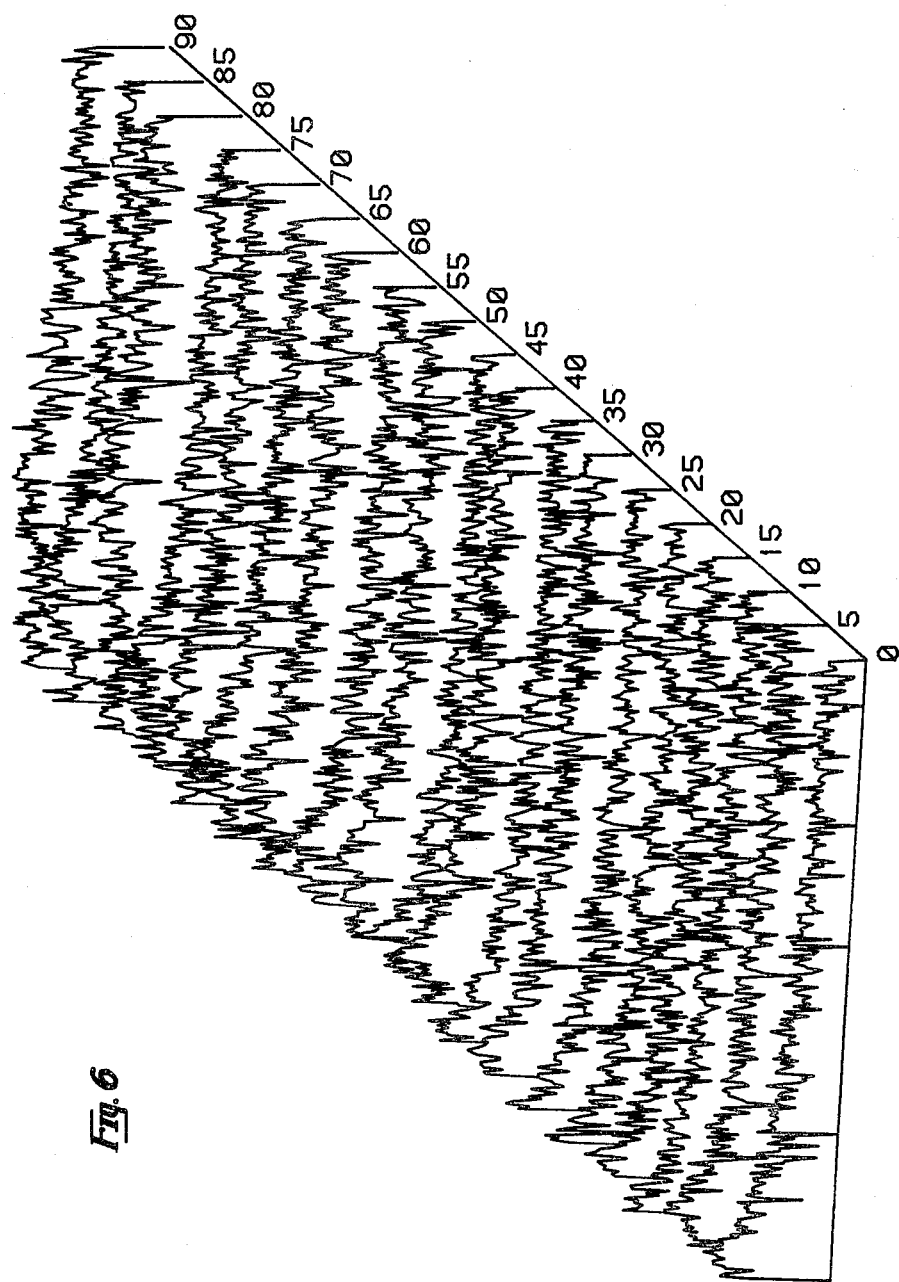
FIG. 6 is a drawing of typical noise spectra.

FIG. 6 is a set of spectra obtained using data listed in Table 1 for the system shown in FIG. 4. The spectra are denoted by values of the phase angle θ. For θ = 90 degrees, the spectra is almost flat. As θ is decreased in value, the spectral width is decreased in a manner resembling a moving cut-off point for a single-pole low pass filter.

The spectral width, for any specified set of selection by the noise spectra select 16 can be varied by altering the frequency of the timing signals furnished to the white noise generator 15. This timing signal can be time modulated in frequency to produce time variant output noise spectra which are useful in imitating the sounds produced by unpitched musical instruments at the output of the envelope modulator 24.

A further flexibility in the variety of noise spectral shapes can be obtained by using complex wave shapes as the data stored in the sinusoid table 12 instead of the simple single frequency sinusoid. For example, if the stored data has a fundamental and n'th harmonic then the noise spectra will exhibit a low-pass shape with a resonant peak corresponding to the n'th harmonic. This type of spectra is applicable to the imitation of percussive sounds such as drums which have a noise-like spectra including broadly resonant peaks.

We claim:

1. A digital noise generator for creating a sequence of digital data words having a controllable spectral shape comprising;

a timing clock for creating a source of timing signals, a noise generator responsive to said timing signals for generating a sequence of noise digital words wherein each noise digital word has a random value, a first memory containing stored values of a first advance increment, a second memory containing stored values of a second advance increment, a third memory containing stored values of a first comparison constant a fourth memory containing stored values of a second comparison constant, a spectral select means providing addressing signals for addressing out a first advance increment value from said first memory, a second advance increment value from said second memory, a first comparison constant from said third memory, and a second comparison constant from said fourth memory, a first comparator means responsive to said addressed out first comparison constant and said noise digital word whereby a first comparison signal is generated if said noise digital word is larger in value than said first comparison constant, a second comparator means responsive to said addressed out second comparison constant and said noise digital word whereby a second comparison signal is generated if said noise digital word is larger in value than said second comparison signal, a data select means responsive to said first comparison signal and to said second comparison signal whereby a selection is made of either said first advance increment value addressed out from said first memory or said second advance increment value addressed out from said second memory, a fifth memory means containing stored output data values, and a memory addressing means responsive to said selection from said data select means for addressing output data values from said fifth memory means thereby creating said sequence of digital data words having a controllable spectral shape.

2. A digital noise generator according to claim 1 wherein said timing clock comprises a variable frequency clock.

3. A digital noise generator according to claim 1 wherein said data select means comprises;

select circuitry whereby said first advance increment is provided to said memory addressing means in response to said first comparator signal, whereby said second advance increment is provided to said memory addressing means in response to said second comparator signal, and whereby a zero value is provided to said memory addressing means if neither said first comparator signal nor said second comparator signal is generated.

4. A digital noise generator according to claim 1 wherein said memory addressing means comprises;

an adder-accumulator means, responsive to said timing signals, for repeatedly adding data selected by said data select means to the sum previously contained in said adder-accumulator means.

5. A digital noise generator according to claim 4 wherein said adder-accumulator means comprises an accumulator which is modulo the number of data values stored in said fifth memory means.

6. A digital noise generator according to claim 1 wherein said data values $S_i$ stored in said fifth memory means are evaluated according to the relation $$S_i = \cos(2\pi i/N),$$

where N is the total number of data values stored and i is an integer having integer values in the sequence range $1, 2, \ldots, N$.

7. A digital noise generator according to claim 1 wherein said data values $S_i$ stored in said fifth memory means are evaluated according to the relation $$S_i = \sum_{j=1}^{M} c_j \cos(2\pi ji/N)$$

where N is the total number of data values stored, i is an integer in the sequence range $1, 2, \ldots, N$, $c_j$ is a preselected set of harmonic constants, and M is the number of harmonic constants in said set of harmonic constants.

8. A digital noise generator according to claim 1 wherein said spectra select means further comprises time variant select means whereby said addressing signals are caused to vary in response to a time variant control signal.

9. A digital noise generator for creating a sequence of digital data words having a controllable spectral shape comprising;

a timing clock for creating a source of timing signals, a noise generator responsive to said timing signals for generating a sequence of noise digital words wherein each noise digital word has a random value, a first memory means containing stored values of a first advance increment, a second memory means containing stored values of a second advance increment, a spectra select means providing addressing signals for addressing out a first advance increment value from said first memory means and a second advance increment value from said second memory means, a first comparator means responsive to said noise digital word whereby a first comparison signal is generated if said noise digital word is larger in value than a first assigned constant value, a second comparator means responsive to said noise digital word whereby a second comparison signal is generated if said noise digital word is larger in value than a second assigned constant value, a data select means responsive to said first comparison signal and to said second comparison signal whereby a selection is made of either said first advance increment value addressed out from said first memory means or said second advance increment value addressed out from said from said second memory means, a third memory means containing stored output data values, and a memory addressing means responsive to said selection from said data select means for addressing output data values from said third memory means thereby creating said sequence of digital data words having a controllable spectral shape.

10. A digital noise generator according to claim 9 wherein said memory addressing means comprises;

an adder-accumulator means, responsive to said timing signals, for repeatedly adding data selected by said data select means to the sum previously contained in said adder-accumulator means.

11. A digital noise generator according to claim 9 wherein said first comparator means further comprises first logic circuitry whereby said first comparison signal is generated if the most significant bit of said noise digital word has the binary value "1".

12. A digital noise generator according to claim 9 wherein said second comparator means further comprises second logic circuitry whereby said second comparison signal is generated if all the bits of said noise digital word have the binary value "1".

13. A digital noise generator for creating a sequence of digital data words having a controllable spectral shape comprising;

a timing clock for creating a source of timing signals, a noise generator responsive to said timing signals for generating a sequence of noise digital words wherein each noise digital word has a random value, a first memory means containing stored values of a first advance increment, a spectra select means for addressing out a first advance increment from said first memory means, an advance increment generator for generating a second advance increment in response to said first advance increment addressed out from said first memory means, a first comparator means responsive to said noise digital word whereby a first comparison signal is generated if said noise digital word is larger in value than a first assigned constant value, a second comparator means responsive to said noise digital word whereby a second comparison signal is generated if said noise digital word is larger in value than a second assigned constant value, a data select means responsive to said first comparison signal and to said second comparison signal whereby a selection is made of either said first advance increment addressed out from said first memory means or said second advance increment generated by said advance increment generator, a second memory means containing stored output data values, and a memory addressing means responsive to said selection from said data select means for addressing output data values from said second memory means thereby creating said sequence of digital data words having a controllable spectral shape.

14. A digital noise generator according to claim 13 wherein said advance increment generator comprises an adder for forming the sum of said addressed out first advance increment and a preassigned constant value.

15. In an electronic musical instrument wherein unpitched percussive musical sounds are generated in response to the actuation and release of a keyswitch apparatus for generating said unpitched musical sounds comprising;

a timing clock for creating a source of timing signals, a noise generator responsive to said timing signals for generating a sequence of noise digital words wherein each noise digital word has a random value, a first memory means containing stored values of a first advance increment, a spectra select means for addressing out a first advance increment value from said first memory means, an advance increment generator for generating a second advance increment in response to first advance increment addressed out from said first memory means, a first comparator means responsive to said noise digital word whereby a first comparison signal is generated if said noise digital word is larger in value than a first assigned constant value, a second comparator means responsive to said noise digital word whereby a second comparison signal is generated if said noise digital word is larger in value than a second assigned constant value, a data select means responsive to said first comparison signal and to said second comparison signal whereby a selection is made of either said first advance increment value addressed out from said first memory means or said second advance increment generated by said advance increment generator, a second memory means containing stored output data values, a memory addressing means responsive to said selection from said data select means for addressing output data values from said second memory means, and utilization means whereby addressed output data values from said fifth memory means are converted to generate said unpitched percussive musical sounds.

16. A musical instrument according to claim 15 wherein said utilization means comprises;

an envelope generator responsive to the actuation and release of said keyswitch for generating a time variant sequence of envelope data values, a modulation means responsive to said sequence of envelope data values for scaling the magnitude of said addressed output data values from said second memory means, and signal conversion means whereby scaled magnitude data values provided by said modulation means are converted to audible sounds.

* * * * *